United States Patent [19]

Chung et al.

[11] 4,456,336
[45] Jun. 26, 1984

[54] HIGH BRIGHTNESS INTERNAL REFLECTOR FOR LIQUID CRYSTAL DISPLAYS AND ITS METHOD OF FABRICATION

[75] Inventors: Chi H. Chung; Sun Lu, both of San Jose; David B. Chung, Alhambra, all of Calif.

[73] Assignee: Minnesota Mining and Manufacturing Company, St. Paul, Minn.

[21] Appl. No.: 433,026

[22] PCT Filed: Oct. 5, 1982

[86] PCT No.: PCT/US82/01442
§ 371 Date: Oct. 5, 1982
§ 102(e) Date: Oct. 5, 1982

[87] PCT Pub. No.: WO83/01310
PCT Pub. Date: Apr. 14, 1983

Related U.S. Application Data

[63] Continuation-in-part of Ser. No. 308,991, Oct. 6, 1981, abandoned.

[51] Int. Cl.³ .................................................. G02F 1/13
[52] U.S. Cl. .................................. 350/338; 350/339 R; 350/339 D
[58] Field of Search .................. 350/339 R, 339 D, 338, 350/276 R

[56] References Cited

U.S. PATENT DOCUMENTS 2,601,806  7/1952  Turner .......................... 350/165 UX
2,911,682  11/1959  Ewald .......................... 350/165 UX
3,912,366  10/1975  Sprokel ........................ 350/339 R
4,097,131  6/1978  Nishiyama ..................... 350/338
4,106,859  8/1978  Doriguzzi et al. ............... 350/338

FOREIGN PATENT DOCUMENTS 2160469  10/1973  Fed. Rep. of Germany ... 350/339 R

OTHER PUBLICATIONS

Levi, L., *Applied Optics*, vol. 2, (John Wiley & Sons 1980), pp. 918–921.
T. J. Scheffer and J. Nehring, "Guest-Host Displays", the Physics and Chemistry of Liquid Crystal Devices, Edited by G. J. Sprokel, Plenum Press N.Y., 1980.
William B. Elmer, "The Optical Design of Reflectors", 2nd Edition, John Wiley & Sons, N.Y., p. 27.
Minoru Hosokawa et al., "Dichroic Guest-Host Active Matrix Video Display", SID 81 Digest, Apr. 19, 1981.

*Primary Examiner*—John K. Corbin
*Assistant Examiner*—Richard Gallivan
*Attorney, Agent, or Firm*—Donald M. Sell; James A. Smith; William B. Barte

[57] ABSTRACT

A reflector for use in liquid crystal displays is disclosed comprising a plate having a micro-lenticular surface over which are successive layers of reflective material, such as aluminum or silver and a light transparent material having a low index of refraction, i.e., an inex of refraction below that of $SiO_2$, which is in optical contact with the reflective layer.

The present invention also contemplates the method of fabricating such a reflective surface.

20 Claims, 8 Drawing Figures

HIGH BRIGHTNESS INTERNAL REFLECTOR FOR LIQUID CRYSTAL DISPLAYS AND ITS METHOD OF FABRICATION

This application is a continuation-in-part of U.S. patent application Ser. No. 06/308,991, filed Oct. 6, 1981, abandoned.

FIELD OF THE INVENTION

This invention relates to a reflector for a liquid crystal display and the method of fabricating the reflector.

BACKGROUND OF THE INVENTION

Liquid crystal displays, particularly those based on guest host or dye switching effects, in general comprise a cell having at least two spaced plates having electrodes selectively disposed on the inner surfaces of the two plates and a liquid crystal composition, such as doped with dyes, filled in the space between the plates. The display device includes means for selectively applying an electric field across the liquid crystal composition through the electrodes to modify the light absorption in the liquid crystal composition when the electric field exceeds a threshold value. The front plate through which the display is to be viewed, of course, is transparent, whereas the back plate typically employs a white reflector located outside the liquid crystal cell. This reflector, in many cases, is a thin layer of white material, such as barium sulfate, that has nearly 100 percent reflectivity and perfect Lambertian scattering providing for excellent off-axis viewing. However, since the reflector is located behind the liquid crystal layer at a distance at least equal to the back plate thickness, the image provided by the display is always accompanied by a slightly offset shadow.

Since liquid crystal display devices such as those utilizing various dye switching effects require scattering reflectors for adequate off-axis viewing, many researchers have tried depositing aluminum or other metallic reflectors over a glass surface uniformly frosted by chemical etching or fine polishing. Although they have been capable of achieving a reflective surface with optical properties very close to those of a standard white material, the shiny aluminum reflector appears darker when a layer of liquid crystal is placed on it. Thus, when the liquid crystal display device is fabricated with a metallic reflector deposited over a frosted back glass plate, it has very low brightness and does not perform well.

Recently, a liquid crystal device has been reported which includes a reflector formed by a thick film silver compound screened and fired on a back glass plate. This reflector, which also is the back electrode of the liquid crystal device, has good brightness, but the resolution obtained in the device is restricted by the coarse patterns achievable by a thick film process. See for example T. J. Scheffer and J. Nehring, "Guest-Host Displays", the Physics and Chemistry of Liquid Crystal Devices, Edited by G. J. Sprokel, Plenum Press, N.Y., 1980.

In the art of reflector design, there are surfaces known as spreading surfaces (see, for example, William B. Elmer, "The Optical Design of Reflectors," 2nd edition, John Wiley & Sons, N.Y., page 27 and following), the optical properties of which are excellent for a reflector placed inside a liquid crystal display. However, a typical spreading surface is generated by impressing or molding carefully designed patterns on a smooth surface. The most commonly used pattern is the positive or negative spherical segment having controlled depth and diameter such as result from peening. Many spreading reflectors are made this way on metals and plastic materials. Unfortunately, it is impractical according to such prior art methods to form such surfaces on a glass plate for a liquid crystal display device.

Clearly, there remains a need for an improved liquid crystal display devices including reflectors which provide high brightness over extended viewing angles.

SUMMARY OF THE INVENTION

Simply stated, the present invention comprises a liquid crystal display which includes a reflector comprising a substrate having a micro-lenticular surface, a layer of reflective material, such as aluminum of silver overlying the micro-lenticular surface, and including a light transparent organic layer having a low index of refraction, i.e., an index of refraction below that of $SiO_2$ overlying and in optical contract with the reflective layer.

The present invention also contemplates the method of fabricating such a reflective surface.

DETAILED DESCRIPTION OF THE INVENTION

As indicated hereinabove, this invention is concerned with a method for preparing a liquid crystal display device which includes a new and improved reflector.

Figure 1A:
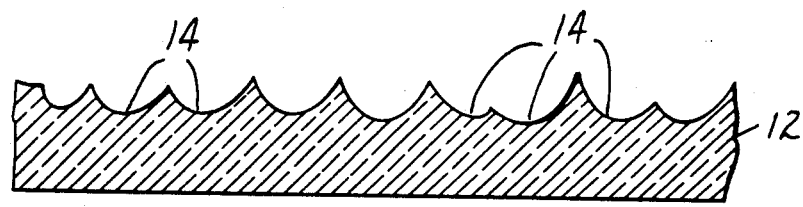
FIG. 1A is a schematic cross-sectional view of a glass plate having a micro-lenticular surface in accordance with the present invention.

As shown in FIG. 1A, the substrate for the reflector of the present invention preferably consists of a glass plate 12 which has a micro-lenticular surface on one major side of the glass plate. Basically, this micro-lenticular surface consists of concave shaped cavities or dimples having a depth ranging from about 0.5 to 2.5 $\mu$m and a diameter ranging from about 5 to 25 $\mu$m. Preferably, the generally concave shaped cavities 14, such as illustratively shown in FIG. 1A, will have a depth of from 1 to 2 $\mu$m, and a diameter from 10 to 20 $\mu$m. The surfaces to a certain extent resemble those obtained on metal and plastic surfaces by the peening action.

Figure 1B:
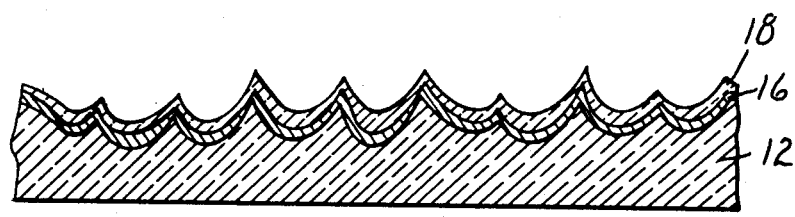
FIG. 1B is a schematic cross-sectional view of a reflector pursuant to the present invention.

As illustratively shown in FIG. 1B, a highly reflective layer 16 is deposited on the micro-lenticular surface of the substrate. The reflective layer, for example, can consist of metals such as aluminum or silver. Alternatively, multi-layer dielectric films, such as $SiO_2$ and $MgF_2$ may also be used. Preferably, however, the reflective layer is aluminum or silver, and most preferably is silver.

Also, as shown in FIG. 1B, a light transparent low index of refraction layer 18 is in optical contact with the reflective layer 16. For example, light transparent layers having an index of refraction not greater than that of $SiO_2$ are thus placed in optical contact with the reflective layer. The index of such a layer is desirably below about 1.46, and preferably below about 1.38. Typical materials suitable for the low index of refraction layer 18 are $MgF_2$ and $SiO_2$ organic materials, especially fluoropolymers.

Significantly, the reflective surface of the present invention can provide a reflection brightness three times greater than a diffuse surface up to 40° viewing angle.

Not wishing to be limited by a theory, but by way of further explanation of the significance of the subject invention, it is believed that there are three possible physical mechanisms which are responsible for a metallic reflector deposited on a frosted glass surface to lose its brightness when a layer of a liquid crystal is placed on it. These physical mechanisms may be identified as:
  (1) Total internal reflection,
  (2) Absorption at the metal and dielectric (liquid crystal) interface, and
  (3) Absorption due to surface plasma-wave.

In order to minimize the reduction in brightness caused by the mechanisms identified above, it is highly desirable to have a reflector for a liquid crystal display device that resembles a 100 percent spreading surface with a well-controlled spreading lobe in optical contact with the liquid crystal material. The reflective layer deposited upon the micro-lenticular surface of the substrate of the present invention has a light reflecting profile which is substantially a spreading profile. The addition of a light transparent layer with a low index of refraction over and in optical contact with the reflective layer has the effect of widening the cone where total internal reflection will not occur, thus expanding the viewing angle over that obtainable with a diffuse reflector.

To illustrate the advantage of this new reflector in liquid crystal display devices, the following measured results were obtained:
  (1) An ordinary external white diffuse reflector (MgO or $BaSO_4$) had a reflectivity of 85% when measured through a cell containing a clear liquid crystal composition.
  (2) An internal reflector consisting of a thin-film of aluminum deposited onto glass frosted by polishing and/or sandblasting and in optical contact with a clear liquid crystal composition within a liquid crystal cell had a reflectivity of 30% relative to that of the external diffuse reflector when measured in the same manner.
  (3) In contrast thereto, an internal reflector made in accordance with the present invention and consisting of a thin-film of silver deposited onto a micro-lenticular surface and having a magnesium floride overcoating, when placed in optical contact with a clear liquid crystal composition within a liquid crystal cell had a reflectivity over a cone of +20° of 140% relative to that of the external diffuse reflector.

Thus, the reflector of the present invention is suitable in providing liquid crystal display devices having a 10:1 contrast ratio with greater than 55% brightness, compared with a 10:1 contrast with less than 40% brightness for similar displays with an external white reflector. The addition of the low index of refraction transparent overlayer is believed to cause light reflected from the micro-lenticular, reflectorized layer to be refracted back toward the direction of incident light. When the refracted light passes through the liquid crystal medium, it is incident on the top cover plate at a reduced angle. Accordingly, even though some light may be reflected from the micro-lenticular reflectorized surface at an angle at which light will reach the top cover plate-air interface at greater than the critical angle at that interface and will there be totally internally reflected, the refraction through the low index layer redirects some of the light, causing it to reach the cover plate-air interface at less than the critical angle such that more light passes therethrough.

The reflector made in accordance with the present invention is particularly suitable for the liquid crystal display devices disclosed in copendind U.S. applications Ser. No. 251,247 filed Apr. 6, 1981 now Pat. No. 4,391,492 and Ser. No. 261,598, filed May 7, 1981 abandoned.

As disclosed in the former patent application (U.S. Ser. No. 251,247), a preferred liquid crystal display device of the present invention utilizes a thermally addressable medium including cholesteric smectic liquid crystal compounds together with pleochroic dyes to provide an absorbing state, such devices being particularly useful in large scale, multiplexed applications. The thermally sensitive medium has a transition between at least two thermal phases, the lower being a smectic phase, and the upper being preferably a cholesteric phase. The medium develops two textures in the smectic phase: a light absorbing texture and a homeotropic texture. The homeotropic texture is developed in portions of the medium by sensitizing the medium as it passes rapidly from an upper thermal phase to the lower, smectic phase. The light absorbing texture is developed in the unsensitized portions of the medium as it goes through the transition to the smectic phase.

The medium is sensitized by applying a voltage to those portions of the medium to be addressed. The addressed portions develop a substantially transparent light state, while the unaddressed portions develop a substantially light absorbing state. The coloring agent or dye which is locked within the liquid crystal medium as it develops its light absorbing texture in the smectic phase will absorb most of the light passing through the medium, the liquid crystal acting as a vehicle to orient the dye molecules into a light absorbing position. Electrodes disposed adjacent the medium are provided for sensitization. Heating electrodes are also provided to heat the medium to the upper thermal phase. In a multiplexed device, the electrodes define a matrix of columns and rows disposed substantially at right angles to each other, and in different planes.

In order to obtain a pleasing, direct viewable display device, the row electrodes are made with a microlenticular substrate and overlying reflective and low index layers to provide high contrast as well as wide viewing angles. Such reflective electrodes further provide for a double pass of light through the cell thus enhancing light absorption. The row electrodes are heated sequentially with electric current, and in x-y matrix operation, the display is written by applying voltages on the column electrodes. During the writing process, only the dots associated with the row where the heating current has just been removed are affected. In other words, only the dots where the liquid crystal material is rapidly cooling to the smectic state respond to the writing pulses on the column electrodes.

As the liquid crystal material cools rapidly through the nematic or cholesteric phase to the smectic phase, it can form two different textures. With a voltage applied on the column electrodes, the liquid crystal material is switched to a homeotropic state during the nematic or cholesteric phase and assumes the homeotropic smectic A texture after cooling is completed. Without the applied voltage, a light absorbing texture is developed instead. Thus, the dots associated with a rapidly cooling row electrode can be written into transparent state or a light absorbing state by applying or not applying voltages on the column electrodes. The smectic or cholestericsmectic material used in such an embodiment preferrably has positive dielectric anisotropy.

The transition must be accomplished reasonably rapidly, hence rapid thermal pulses are used that heat the liquid crystal locally but do not significantly heat the surrounding glass. Hence the natural cooling period immediately following the passage of the heat pulse is also rapid and hence the liquid cyrstal medium passes through the nematic or cholesteric phase rapidly. This greatly enhances the optical effect and results in greater contrast.

Another preferred liquid crystal display device of the present invention utilizes the reflector structure as here disclosed in conjunction with a thermally activatable display device having a thermal barrier between the bottom, typically reflective electrodes, and a substrate which generally supports the liquid crystal medium, such as is disclosed in the above referenced patent application, Ser. No. 261,598. Such a construction may comprise an underlying substrate such as a glass plate onto which is applied a subassembly of a polymeric base having a microlenticular top surface with successive overlying reflective and low index layers.

The insulative character of the thermal barrier may be defined as a thermal layer having a coefficient of thermal conductivity approximately less than $15 \times 10^{-4}$ cal sec$^{-1}$ cm$^{-1}$ °C$^{-1}$.

This thermal layer will allow the liquid crystal medium to absorb significantly more of the heat generated by the heating electrode.

The thermal barrier or layer may have a cellular, voided or gas entrained structure to improve its insulative efficacy, although it will also function without this internal structure. This layer will generally include at least one organic polymer usually selected from a class of imides or amides. For this purpose, an imide quinoxaline polymer has been found to work well. Also, vapor coated films of xylylene polymers such as poly(p-xylylene) and poly(chloro-p-xylylene) are desirably utilized, thus providing a very even and uniform coating which accurately conforms to the underlying substrate. The thermal barrier should be made with an approximate thickness in a range from 0.5 to 100 microns.

Turning now to a preferred method of fabrication of the micro-lenticular reflector of the present invention, first a glass substrate is provided which has at least one major surface having concave shaped cavities with depths in the range of about 0.5 to 2.5 $\mu$m and diameters ranging from about 5 to 25 $\mu$m, and preferably depths of 1 to 2 $\mu$m and diameters of 10 to 20 $\mu$m. This micro-lenticular surface can be obtained by a combination of polishing and etching a glass plate. Indeed, it is particularly preferred to polish a soda-lime glass plate using a lapping machine, for example, such as a Highland Park Vi-Bro-Lap-model 20VL. In order to get effective polishing action, a thin layer of polishing mixture, such as a mixture of 30% by weight of 12.5 $\mu$m Al$_2$O$_3$ and 70% by weight of deionized water, to which 5 grams of detergent is added, is applied on the surface of the machine by brushing. The glass plate is then polished until a uniform diffuse surface is observed. For example, the soda-lime glass can be polished from about 10–30 minutes to achieve such a surface. After lapping, the glass is removed from the lapping machine and thoroughly cleaned. The so-polished glass has a very random rough surface. This surface roughness is reduced preferably by etching the glass in an appropriate etching solution, such as a 6:1 Buffered Oxide etch solution sold under the name of Buffor Oxide solution by Ashland Chemical Company, Specialty Chemical Division, Easton, Pa. Using the aforementioned Buffor Oxide solution, generally it is preferably to etch the soda-lime glass for approximately 30 minutes to achieve the desired micro-lenticular surface properties. After etching, of course, the surface is cleaned with appropriate solvent or solvents, such as by treatment with deionized water, followed by rinsing with methanol.

Figure 2A:
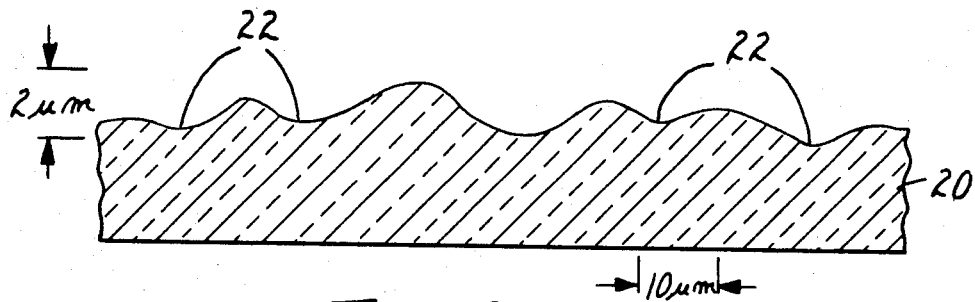
FIG. 2A is a schematic cross-sectional view of another plate prepared with a micro-lenticular surface according to the present invention.
Figure 3A:
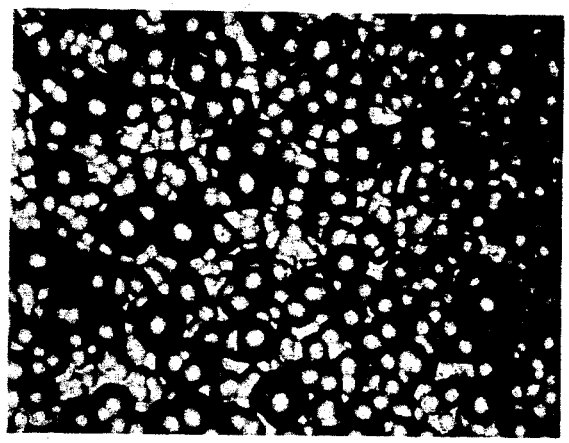
FIG. 3A is a microphotograph at 200 x of a micro-lenticular surface in accordance with the present invention.
Figure 3B:
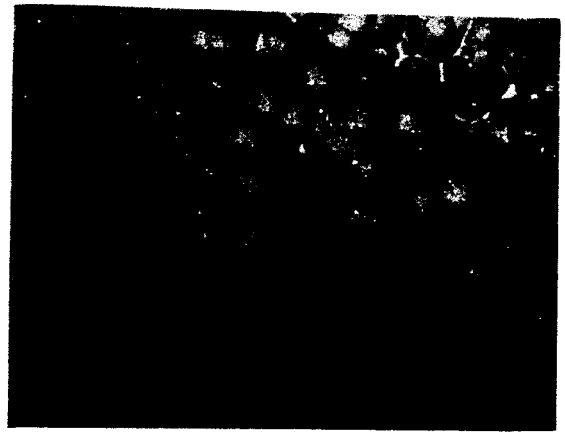
FIG. 3B is a microphotograph at 400 x of a micro-lenticular surface in accordance with the present invention.

The reduced roughness surface thus obtained is shown in cross-sectional view in FIG. 2A, where, as determined with a surface topological probe, it may be seen that the surface of the glass substrate 20 mainly consists of shallow, less than 2 $\mu$m deep cavities 22 of roughly 10–20 $\mu$m diameter. The micro-structure of the resultant surface is further shown in the microphotographs of FIGS. 3A and 3B, which were prepared at 200x and 400x magnification respectively.

Figure 2B:
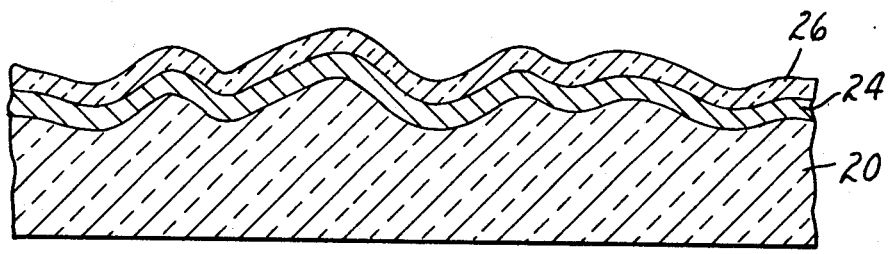
FIG. 2B is a schematic cross-sectional view of the plate shown in FIG. 2A further processed as a microlenticular reflector pursuant to the present invention.

As further shown in FIG. 2B, after providing an appropriate micro-lenticular surface, a reflective layer 24 is deposited on the surface of the glass substrate 20. Any reflective material may be employed, such as aluminum, silver, metals and multi-film dielectrics. However, in the practice of the present invention, it is particularly preferred to use aluminum or silver films. The reflective film can be deposited by well-known techniques. For example, aluminum or silver may be vacuum deposited on the micro-lenticular surface. The amount of metal deposited will, of course, depend on a variety of factors, such as the desired resistance of the device incorporating the reflective layer. In general, the light reflective layer will range in thickness from about 1000 Angstroms to about 15,000 Angstroms.

Figure 4:
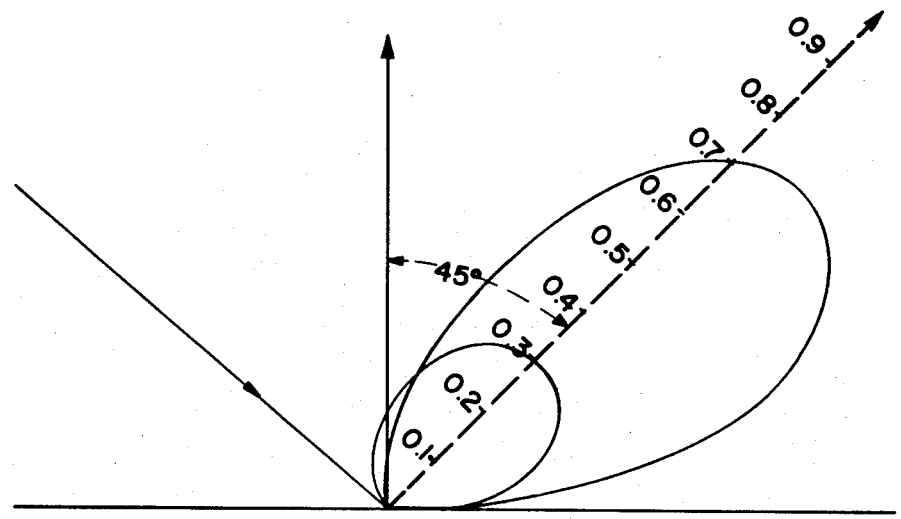
FIG. 4 shows the reflective profile of a 45° incident beam on a lapped surface and on a micro-lenticular surface.

The significance of providing a micro-lenticular surface is demonstrated in FIG. 4, wherein the reflective profile of a 45° incident beam on a lapped surface having a 1500A° thin-film of Al deposited thereon is compared with the reflective profile of a 45° incident beam on a microlenticular surface obtained in accordance with the steps outlined above, both surfaces having 1500A° thin-films of Al deposited thereon. In FIG. 4, the brightness scale shown is, of course, an arbitrary scale.

Finally, as also shown in FIG. 2B, after obtaining the requisite reflective surface layer 24 deposited on the micro-lenticular surface of the glass substrate 20, a light transparent layer 26 is placed over and in optical contact with the reflective layer 24. The light transparent layer, as indicated previously, is one which has an index of refraction as low as possible. Thus, for example, indices as high as that of thin-films of $SiO_2$, which are generally below about 1.46, and are preferably in the range from about 1.33 to 1.46, are preferred. Generally, the thickness of the low reflective index, transparent layer will be in the range of about 500 Angstroms to 2000 Angstroms, and preferably about 1000 Angstroms. Among the inorganic materials suitable as low index of refraction, transparent layers are $Na_3AlF_6$, $MgF_2$ and $SiO_2$. Also, many low index organic materials, especially fluoropolymers, including polytetrafluoroethylene (n=1.34), polyfluorochloroethylene (n=1.42) and poly- vinyladene fluoride (n=1.42) are also suitable. The light transparent material can be deposited by any one of the known techniques, such as electron beam evaporation, ion-sputtering, and thermal vapor deposition.

As indicated previously, the liquid crystal display devices having an internal reflector of the present invention, exhibit significant improvement in brightness over similar displays employing an external white reflector.

Figure 5:
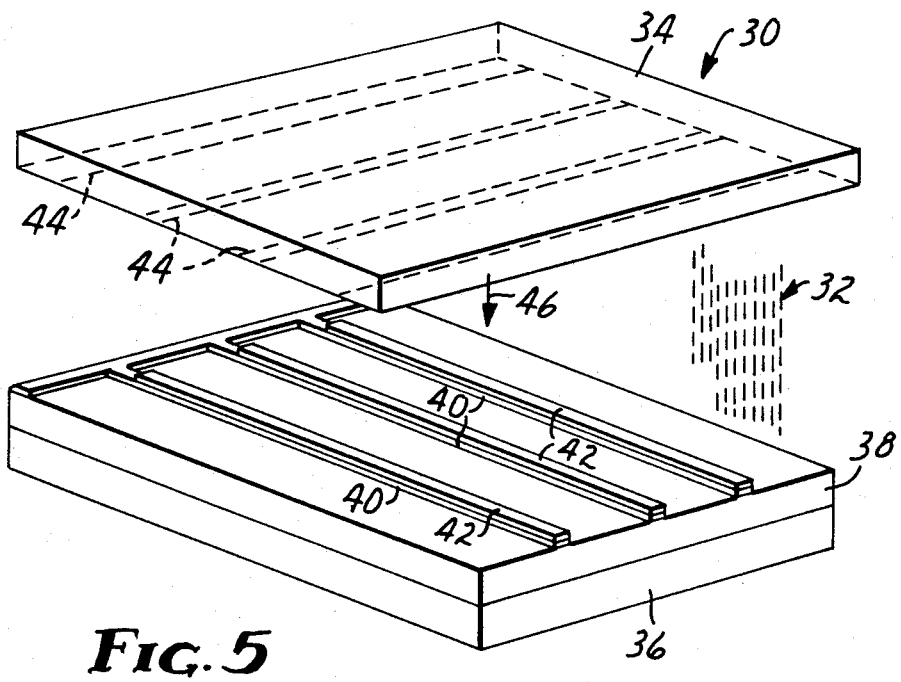
FIG. 5 is a perspective, exploded schematic view of a liquid crystal display device made in accordance with the present invention.

Now referring to FIG. 5, an exploded view of a typical multiplexed, visual display device 30 according to the present invention, is illustrated. The device comprises a liquid crystal medium 32 containing a pleochroic dye, which medium is disposed between two glass substrate plates 34 and 36, respectively. The bottom substrate plate 36 has a micro-lenticular surface thereon. A thermal barrier 38 replicating the micro-lenticular surface is applied over the substrate 36, and a plurality of reflecting row electrodes 40, etc. are disposed over the barrier 38. Further, on top of the row electrodes are deposited films 42 of a low index material, all of which replicate the micro-lenticular surface on the substrate 36. The row electrodes 40 make up one half of the x-y matrix for addressing the liquid crystal medium 32. The row electrodes 40 are made of electrically conductive, light reflective material such as silver or aluminum, deposited on the barrier 38.

The top plate 34 supports a plurality of column electrodes 44, which make up the remaining half of the x-y matrix. The column electrodes 44 are electrically conductive and can be formed from materials such as indium oxide or tin oxide.

The liquid crystal medium 32 is generally sealed such as by an epoxy preform (not shown) between the two substrate plates 34 and 36 with the electrodes on each side in optical contact with the liquid crystal medium. Light (generally ambient) is passed through the glass composite as shown in the direction of arrows 46 and is reflected off the reflectorized electrodes 40.

The thermal barrier 38 insulates the row electrodes 40 and the liquid crystal medium 32 from the glass substrate 36 such that much of the heat generated by the row electrodes passes into the liquid crystal medium 32 and a smaller amount of the heat energy passes into substrate 36. This provides for a more efficient use of energy; the row electrodes now requiring less electrical current in order to cause a phase change in the liquid crystal medium.

In contrast to the micro-lenticular surfaced glass plates discussed above, the micro-lenticular surfaced thermal barrier 38 is desirably formed of a material having a low thermal conductivity, i.e., less than $15 \times 10^{-4}$ cal sec$^{-1}$ cm$^{-1}$ C$^{-1}$. Such a property is commonly met by most thermosetting and thermoplastic polymers, enabling the micro-lenticular surface to be readily formed thereon by conventional replication techniques. Where a positive, or convex micro-lenticular surface is desired, a previously prepared micro-lenticular surfaced glass plate may be used as a master. Conversely, when a negative or concave surface is desired, the glass plate may be further processed, such as by electro-forming techniques, to provide a highly durable convex shaped master from which large quantities of approximately surfaced polymeric sheets may be replicated.

Although the subject invention has been described with particular reference to a reflective surface for liquid crystal display devices utilizing various dye switching effects, it should be appreciated that the reflective surface of the present invention will have many other applications and, therefore, broad latitude, modification and substitution are intended in the foregoing disclosure. Accordingly, it is appropriate that the appended claims be construed broadly and in a manner consistent with the spirit and the scope of the invention herein.

We claim:

1. A liquid crystal display device including at least a top and bottom cover plate spaced apart from each other and having at least one electrode selectively disposed on the inner surface of each plate, a liquid crystal composition filling the space therebetween and in contact with a least one electrode on each plate such that an electrical potential applied to such electrodes effects a change in the optical state of the liquid crystal material located between the electrodes, said device further including a reflector assembly positioned between the plates, said reflector assembly comprising a substrate having a micro-lenticular surface, a reflective structure overlying and substantially replicating the micro-lenticular surface, and light transparent, low index outer organic layer overlying the reflective structure and also substantially replicating the micro-lenticular surface and in contact with the liquid crystal composition, which outer layer has an index of refraction not greater than that of $SiO_2$, whereby the micro-lenticular surface, in combination with the replicated, low index outer layer results in an optically spreading reflector assembly having a high decree of reflectance over an extended viewing angle, the low index layer causing light reflected from the reflective structure and reaching the outer surface of the cover plate at greater than the critical angle at that surface whereat it would be totally internally reflected, to be redirected such that some of the light reaches that surface at less than the critical angle, thus allowing more light to pass out of the device.

2. A display device according to claim 1 wherein said substrate comprises a glass plate having concave shaped micro-cavities on a surface thereof.

3. A display device according to claim 1, wherein said substrate comprises a polymeric sheet having convex shaped micro-cavities on a surface thereof.

4. A display device according to claim 1, wherein said micro-lenticular surface consists of convex or concave shapes having a peak-to-peak amplitude ranging from 0.5 μm to 2.5 μm and a diameter ranging from 5 μm to 25 μm.

5. A display device according to claim 1, wherein said reflective structure is selected from aluminum, silver and multiple layer dielectrics.

6. A display device according to claim 1, wherein said reflective structure comprises a layer of metallic, relatively conductive film which may function as a said electrode to which an electrical potential may be applied.

7. A display device according to claim 6, wherein said conductive film is primarily aluminum or silver.

8. A display device according to claim 7, wherein said conductive film ranges in thickness from 1000 Angstroms to 15,000 Angstroms.

9. The display device according to claim 1, wherein said transparent layer has a index of refraction of from 1.33 to 1.46.

10. The display device according to claim 9, wherein said transparent layer has a thickness of from about 500 Angstroms to 2000 Anstroms.

11. The display device according to claim 10, wherein the organic transparent layer is selected from fluoropolymers, including polytetrafluoroethylene, polyfluorochloroethylene, and polyvinylidene fluoride.

12. In a liquid crystal display device including a liquid crystal composition disposed between two spaced plates, one of which is a light transparent front plate, and other of which is an electrically insulating rear plate, the improvement comprising:
said rear plate having on the inner surface thereof a micro-lenticular surface,
said micro-lenticular surface having deposited thereon a layer of light reflective material which replicates the micro-lenticular surface, and
said light reflective material having deposited thereon an organic layer of light transparent material, the outer surface of which also replicates the micro-lenticular surface and is in optical contact with said liquid crystal composition, the index of refraction of said transparent material being not greater than that of $SiO_2$.

13. A liquid crystal display device comprising
(a) an enclosure containing a liquid crystal material therein;
(b) a front window for passing light into the enclosure to be preferentially reflected therefrom, having substantially transparent electrode covering at least a portion of the inner surface of the window, and
(c) at least one rear electrode adjacent a rear portion of the enclosure and separated by the liquid crystal material from the transparent electrode, said electrodes being adapted to allow application of an electric potential therebetween to thereby polarize the liquid crystal material to selectively alter the reflectivity thereof, characterized by a reflector structure positioned between said at least one electrode and said liquid crystal material, said structure including a
(i) substrate having a micro-lenticular, substantially optically spreading surface thereon,
(ii) a layer of light reflective material overlying and conforming to said micro-lenticular surface for providing a substantially optically spreading reflectorized surface, and
(iii) an organic layer of a light transparent material overlying the layer of the light reflective material and in optical contact therewith, said light transparent material having an index of refraction not greater than that of $SiO_2$ whereby the optically spreading reflectorized surface in combination with the layer of low index material results in a high degree of reflection over an extended viewing angle within which total internal reflection at the outer surface of the front window does not occur, thus extending the useful viewing angle of the display device.

14. A method for fabricating a reflective surface for liquid crystal display devices comprising:
providing a substrate having on at least one major surface thereof a micro-lenticular surface,
depositing on said micro-lenticular surface a layer of light reflective material and thereafter depositing a light transparent organic material over and in optical contact with said layer of light reflective material, said light transparent material having an index of refraction not greater than $SiO_2$.

15. The method according to claim 14 comprising providing said micro-lenticular surface by lapping a glass plate and then thereafter etching said lapped glass plate for a time sufficient to provide a surface having a plurality of concave indentations on the surface thereof ranging in thickness and depth from about 0.5 to 2.5 $\mu$m and having diameters ranging from about 5 to 25 $\mu$m.

16. The method according to claim 15 comprising continuing said etching for approximately 30 minutes.

17. The method according to claim 16 comprising depositing said light reflective film by vacuum deposition.

18. The method according to claim 17 comprising depositing said light reflective layer until it has a thickness ranging from about 1000 to 15,000 Angstroms.

19. The method according to claim 18 comprising depositing said light transparent layer to a thickness generally ranging from about 500 Angstroms to 2000 Angstroms.

20. The method according to claim 15, further comprising using said lapped and etched glass plate as a master and forming therefrom polymeric substrates having a micro-lenticular replicated surfaces.

* * * * *